No. 879,923.　　　　　　　　　　　　　PATENTED FEB. 25, 1908.
J. T. STODDARD.
GANG EDGER.
APPLICATION FILED JUNE 10, 1907.

4 SHEETS—SHEET 2.

Witnesses.　　　　　　　　　　　　　　Inventor.
　　　　　　　　　　　　　　　James T. Stoddard
　　　　　　　　　　　　　　by R. C. Wright.
　　　　　　　　　　　　　　　　Attorney.

No. 879,923. PATENTED FEB. 25, 1908.
J. T. STODDARD.
GANG EDGER.
APPLICATION FILED JUNE 10, 1907.

4 SHEETS—SHEET 4.

Witnesses.
Truman J. Glover.
Lester L. Curl.

Inventor.
James T. Stoddard
by R. C. Wright.
Attorney.

UNITED STATES PATENT OFFICE.

JAMES T. STODDARD, OF WESTPORT, OREGON.

GANG-EDGER.

No. 879,923.  Specification of Letters Patent.  Patented Feb. 25, 1908.

Application filed June 10, 1907. Serial No. 378,211.

*To all whom it may concern:*

Be it known that I, JAMES T. STODDARD, a citizen of the United States, residing at Westport, in the county of Clatsop and State of Oregon, have invented a new and useful Improvement in Gang-Edgers, of which the following is a specification, reference being had to the accompanying drawings.

My invention relates to the construction and operation of the saw shifting mechanism in gang-edgers.

The object of my invention is to provide in a gang-edger, a new and easily adjustable, saw shifting mechanism, which will permit the accurate and prompt movement of the saws and locking of the same in adjusted position, as also to allow said mechanism to be moved forward and backward to adjust the shifters to various sizes of saws, or to remove saws from the arbor, and of a construction to prevent the clogging of the machine by dirt, pitch, saw dust and extraneous matter. I attain these objects and other advantages by the mechanism, construction, combination, and arrangement of parts illustrated in the accompanying drawings, which form a part hereof.

It is well known that gang-edgers get out of order and clog up with saw dust so they must be often stopped and repaired or cleaned. The saws in machines heretofore in use cannot be quickly and easily moved, or accurately retained in position, or saws of any size used, and it is to overcome these difficulties that I have sought out and provided the machine herein described which is novel, useful and economical.

Figure 1:
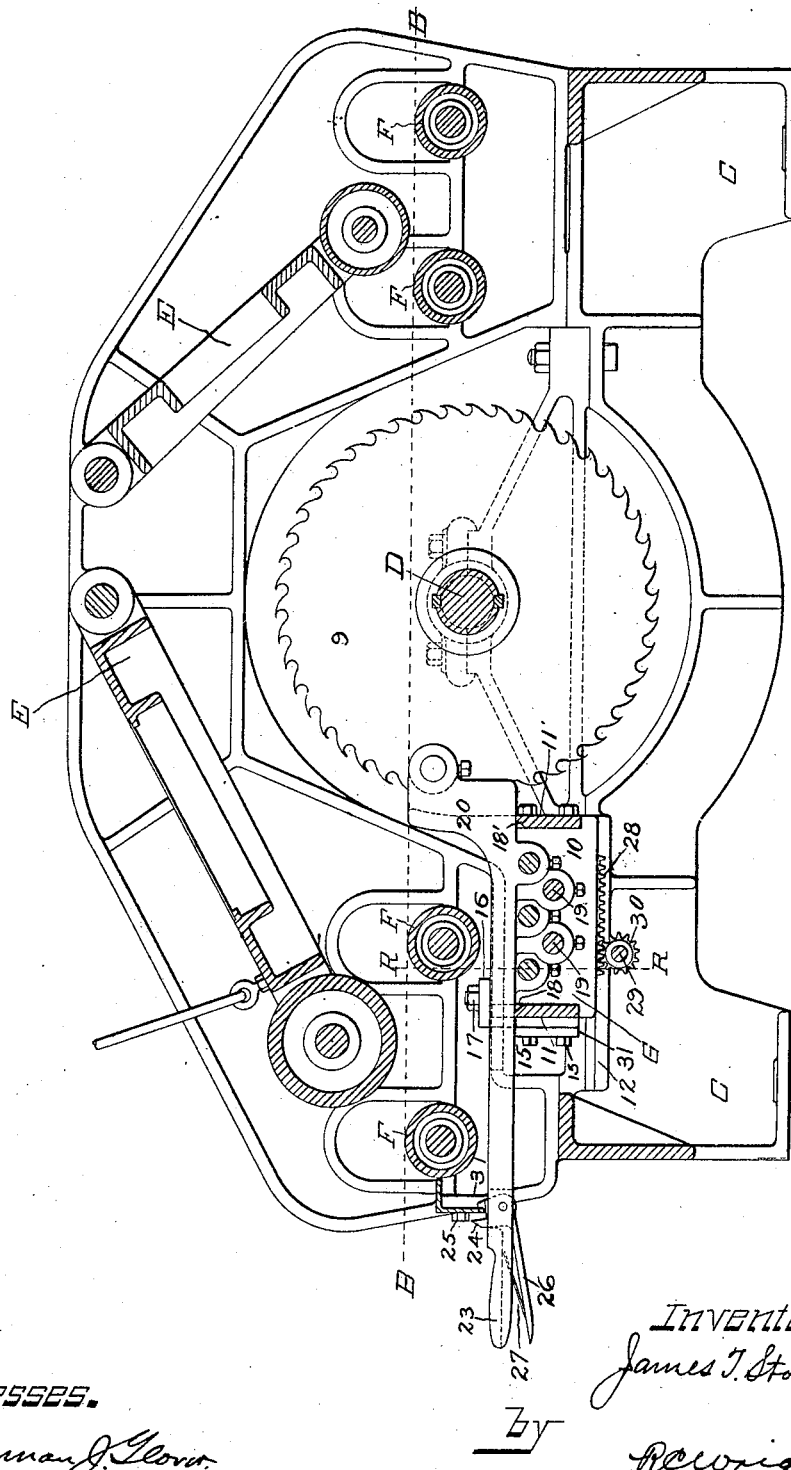
Figure 2:
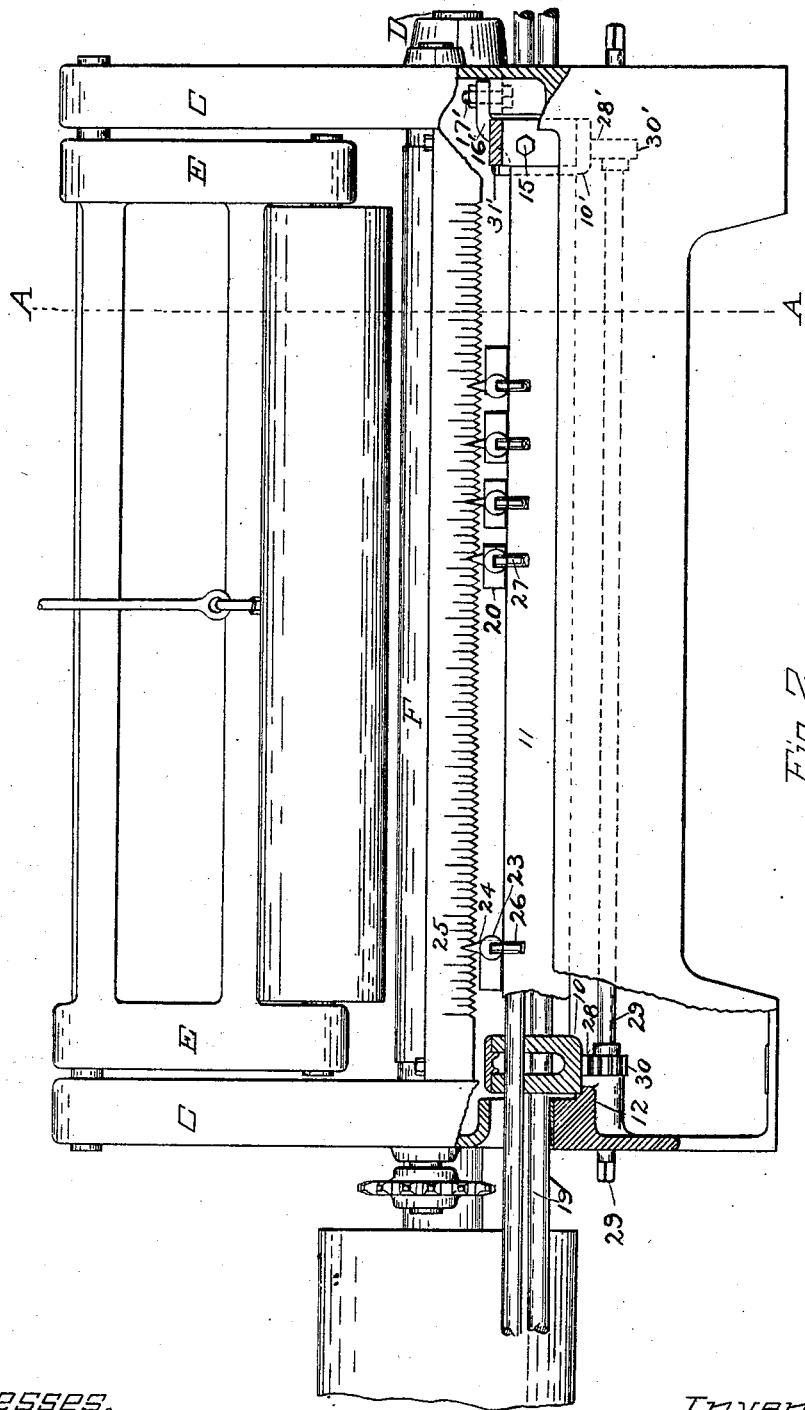
Figure 3:
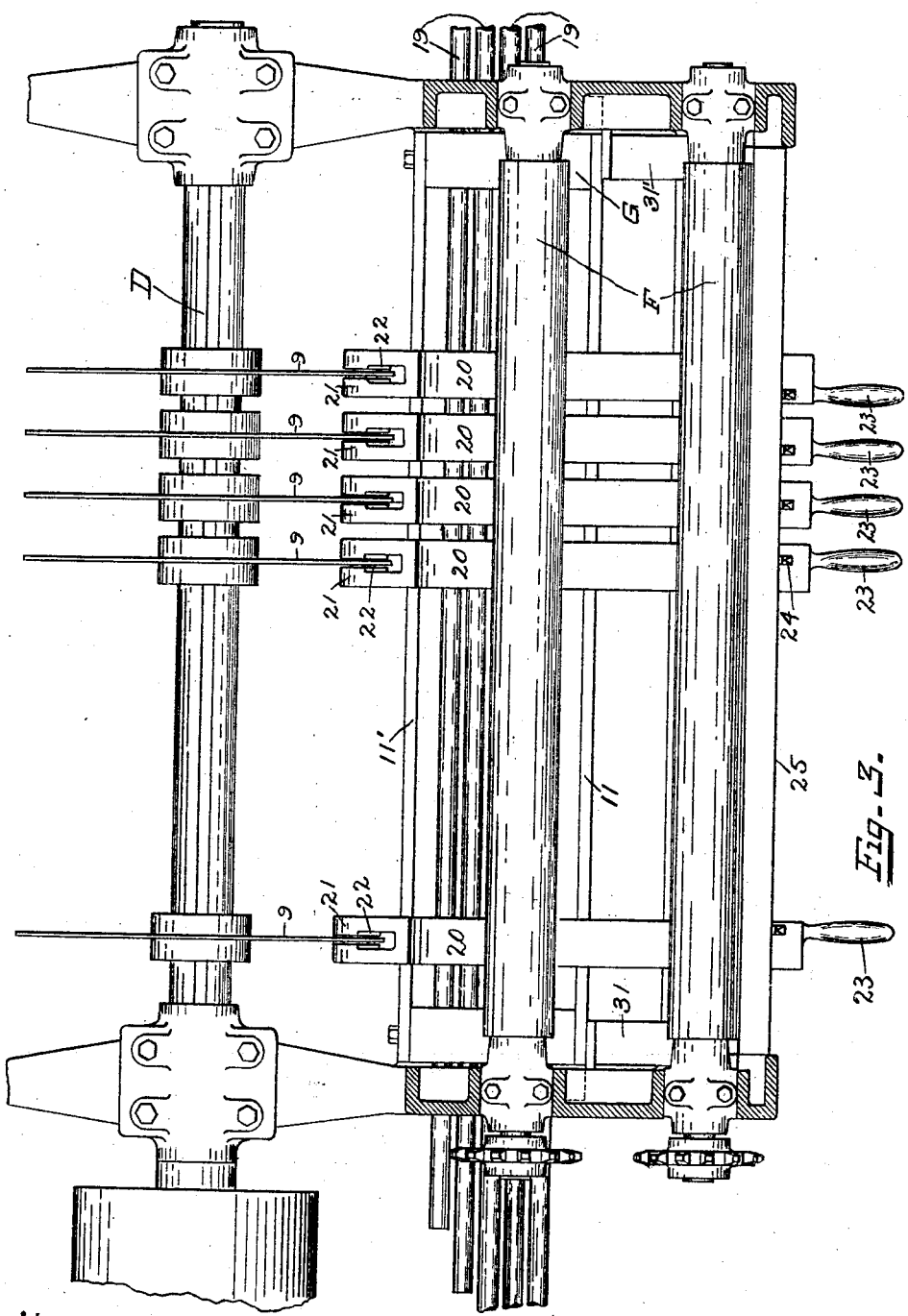
Figure 4:
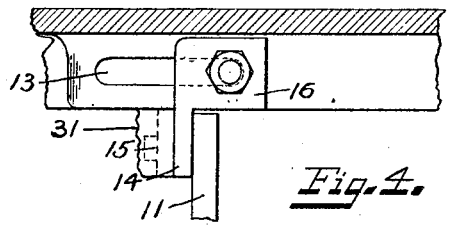
Figure 5:
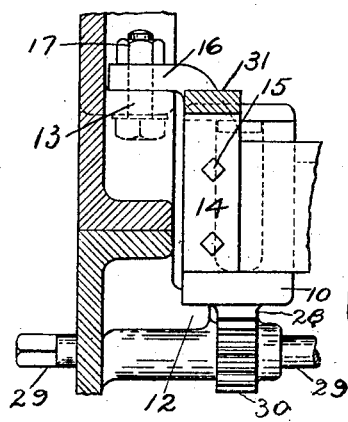
Figure 6:
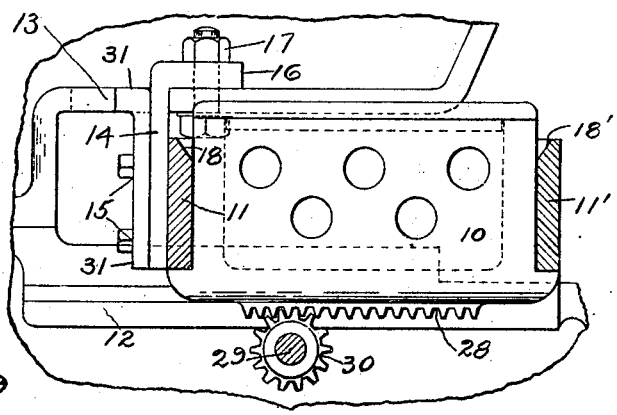
Figure 7:
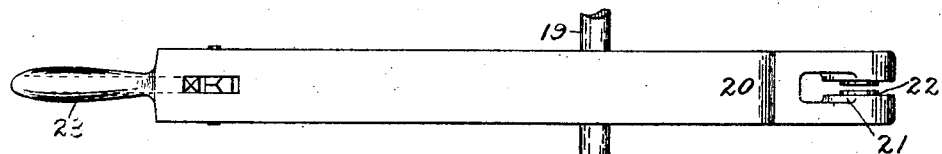
Figure 8:
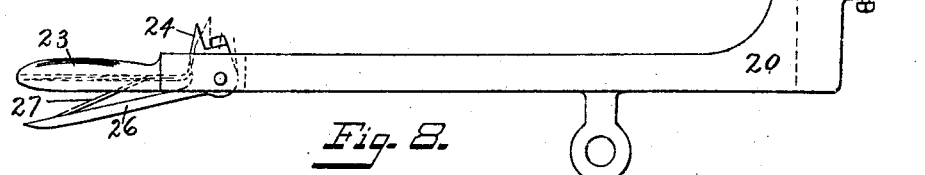

Figure 1 is a sectional side view on the line A—A of Fig. 2. Fig. 2 is a front elevation with a portion of one end sectional, on the line R—R of Fig. 1. Fig. 3 is a sectional plan view on the line B—B of Fig. 1, the rear portion being omitted. Figs. 4, 5, 6 are detail views showing the oil box and means for securing the movable frame in any desired position to which it may be adjusted. Figs. 7, 8 are detail views of parts of the shifters.

Like numerals and letters refer to like parts throughout the views.

C is the standard frame of the edger.

D is the saw arbor suitably mounted in the frame C and carrying a battery of saws 9 keyed thereon in the usual manner.

E is the presser roller mechanism of any suitable construction.

F are feed rollers mounted in the frame C in suitable positions.

In the front part of the frame C, a sliding frame G is placed and it is adapted to be moved longitudinally within the standard frame C. The frame G has its ends constructed to form rectangular oil boxes 10—10' and these are secured by the side bars 11—11'. The bars 11—11' are formed with their upper edges 18—18' beveled, Fig. 1. The sliding frame G rests upon guides 12—12' formed on the frame C which guides extend longitudinally of the machine.

In the frame C are formed slots 13, Figs. 4, 5, 6. A fastening part 14 is also provided and of a form adapted to be secured to the sliding frame G by the bolts 15 and having ears 16—16' extending over the slots 13 and carrying bolts 17 extending through the slots to secure the ears to the frame C in any adjusted position. The rectangular oil boxes are provided with recesses of suitable dimensions adapted to hold waste saturated with oil. Transversely through the oil box ends 10—10' are a suitable number of openings adapted to receive the shifting rods 19 and allow the free longitudinal movement of the same through the boxes. The standard frame is also of such form as to allow the ends of these shifting rods 19 to be moved beyond the vertical planes of its sides a suitable distance. Racks 28—28' are provided on the under surfaces of the oil box ends of the frame G and a shaft 29 is mounted in a suitable position in the standard frame C below the sliding frame. At each end of the shaft 29 are pinions 30—30' adapted to engage the racks 28—28'. The shaft 29 is squared at each end to receive a wrench or handle.

Saw shifting bars 20 are fixedly secured in suitable position upon the shifting rods 19 at right angles thereto. The shifting bars 20 are provided with yokes 21 and wooden friction blocks 22, in the usual manner. The yokes 21 are formed so as to arrange the tops of same on a horizontal plane with the surface of the feed rollers F, as for example, on the line B—B of Fig. 1. The shifting bars 20 are provided with handles 23 and dogs 24, the latter pivoted on the shifter bars in a position vertically below V shaped teeth formed on the lower edge of a graduated scale plate 25 which is fixedly secured to the standard frame C. The dogs 24 are pivoted in such position as to be moved into and away from engagement with the scale teeth, in an arc longitudinally of the machine. The dog has a latch lever 26 on its lower side fixedly secured to it and outwardly retained by the spring 27. The bar handles 23 are placed in such a position upon the bars with relation to the longitudinal direction of the saws and the saw kerf as will pre-determine the necessary allowance for the distance the dogs shall be moved laterally of the edger along the graduated scale plate. The dogs 24 are so formed and arranged that when the latched lever is operated, they will clear the teeth of the scale plate and when the latch is released they will engage the teeth and lock the bar in any desired position. The pivot of the dogs 24 is arranged substantially in a vertical line below the teeth of the scale plate 25.

It will now be seen that by grasping the handles 23 and pressing the latch 26, the dogs are disengaged from the gage plate teeth and the shifter bars can be moved laterally towards either side of the frame to shift the saws as may be desired. On releasing the latch lever it springs outwardly, bringing the pivoted dogs into engagement with the scale plate teeth in the desired position and locks the bar and the saw in that position. The rods 19, which carry the shifting bars, pass through the sides of the sliding frame G, and through the oiled waste in the boxes, which tends to prevent the rods from accumulating gum and resinous product from the wood, which in turn fills with saw dust and thus tends to clog the free movement of the shifters. The handles 23 are secured to the shifting bars at differing locations with respect to the center thereof and as previously stated, this arrangement allows for the loss of board measurement caused by the saw kerf and enables the operator to set the saws for any regular, full measurement of boards as indicated on the scale without the necessity for mentally calculating the loss for saw kerf and allowing for it upon the scale as he shifts the saws, and greater accuracy and speed is thereby attained in the operation of my machine. By arranging the bearings 10—10' of the shifter bars 20 at a suitable distance apart, and at the sides of the sliding frame G, a very secure and rigid adjusted position of the shifter and the saw held by it is attained, thereby practically eliminating the vibration and oscillatory movement common to shifters. It will also be noted, that by reason of forming my shifter yokes so their upper surfaces are in a horizontal plane with the feed rollers, the material thus has a surface over which it can slide, immediately adjacent to the saws as it passes into engagement with them. The shifters are provided with a firm seat upon the side bars 11—11' of the sliding frame, which enables them to withstand the downward pressure of material passing over them. The bars 11—11' are designedly formed with beveled edges 18—18' so that resinous products from the material will have but limited horizontal surface upon which to gather and being scraped from the wood by said beveled edge, will flow downward on the bar and off the machine entirely. It will further be seen, that when the adjusting bolts 17 are loosened and the shaft 29 rotated the sliding frame G can be moved longitudinally within the machine forward or backward, and all shifters drawn away from the saws to allow the arbor to be removed without taking out the shifting mechanism or any part of the same. It also enables the operator to adjust the yoke of the shifters very accurately to the saw so that varying sizes of saws can be easily and quickly substituted and used. The scale plate being provided with V shaped teeth it is clearly apparent that a very close graduation of board measurement can be attained in connection with the dogs adapted to engage these teeth. Also by reason of the dog pivots being directly below the scale plate teeth, any upward pressure of the saw shifters cannot release the dogs, but they remain securely locked in their adjusted positions until the latch lever is operated.

I claim:

1. In a gang-edger, the combination with saws keyed on arbors mounted in a suitable frame, provided with feed and presser roller mechanism, of saw shifters placed in a sliding frame G having side and end bearings therefor and comprising the shifting bars 20 fixedly secured at right angles in suitable positions upon rods 19, laterally movable of the machine, adapted to pass through openings in the sides of the sliding frame, yokes 21 having friction blocks and formed of a height to make bearing surfaces for material passing over them in the horizontal plane of the feed rollers, the handles 23 and dogs 24 pivoted thereon and of such form and in position to adapt them to engage V-shaped teeth which are formed vertically above the dogs in the lower side of a graduated scale plate fixedly secured in the standard frame C, and dog latch levers 26, outwardly retained by springs 27 substantially as described.

2. In a gang-edger, the combination with saws keyed on arbors mounted in a suitable frame, provided with feed and presser roller mechanism, of a longitudinally sliding and saw shifter carrying frame G, resting upon guides 12—12', formed in the standard frame C and having slots 13, means to secure the sliding frame in adjusted position with relation to the saws, and means to move the frame G longitudinally, side bars 11—11' formed with beveled upper edges, and of a height adapting them to receive the shifters in sliding engagement, end parts 10—10' formed with rectangular oil waste boxes therein and having a suitable number of transverse openings adapted to receive rods carrying saw shifters fixedly secured thereon and allow their free longitudinal movement through the same, substantially as described.

3. In a gang-edger, a saw shifter, fixedly secured in suitable position at right angles to and upon a rod 19, which is movable transversely to the vertical plane of the saws and is mounted in bearings at each side of the machine, located apart from each other a distance not less than that from the friction blocks to the handle in the shifter, having means to engage the saw and to lock and release it in any desired position, substantially as described, 4. In a gang-edger a longitudinally sliding saw shifter carrying frame G, resting upon guides 12—12', formed in the standard frame C and having slots 13, and means to secure the frame in adjusted position with relation to the saws, and means to move the frame G longitudinally, side bars 11—11', formed with beveled upper edges and of a height adapting them to receive shifters in sliding engagement, end parts 10—10' formed with rectangular oil waste boxes therein, and having a suitable number of transverse openings adapted to receive rods carrying saw shifters fixedly secured thereon, and allow their free longitudinal movement through the same, substantially as described.

5. In a gang-edger, rectangular oil waste boxes formed in the side of the frame and having a suitable number of transverse openings adapted to receive rods carrying saw shifters fixedly secured thereon and allow their free longitudinal movement through the same, substantially as described.

6. A gang-edger, comprising a standard frame C with saws keyed on an arbor mounted therein, feed and presser roller mechanism, and a saw shifting mechanism consisting of a longitudinally sliding saw shifter carrying frame G, resting upon guides 12—12', formed in the frame C having slots 13 and means to secure the sliding frame in adjusted position with relation to the saws, and means to move it longitudinally, side bars 11—11' formed with beveled upper edges and of a height adapting them to receive the shifters in sliding engagement, end parts 10—10' formed with rectangular oil waste boxes therein and having a suitable number of transverse openings adapted to receive saw shifter carrying rods 19 and allow their free longitudinal movement through the same, saw shifters having bars 20 fixedly secured at right angles in suitable positions upon rods 19, laterally movable of the machine, adapted to pass through the said oil box openings, the shifters being formed with yokes 21 having friction blocks and of a height to make bearing surfaces for material passing over them in the horizontal plane of the feed rollers, also having handles 23 and dogs 24 pivoted thereon and of such form and in such position to adapt them to engage V shaped teeth which are formed vertically above the dogs in the lower side of a graduated scale plate fixedly secured in the standard frame C, and dog latch levers 26 outwardly retained by springs 27, and a graduated scale plate 25 having V shaped teeth on its lower side, fixedly secured to the sliding frame G, all substantially as described.

7. In a gang-edger, a saw shifter provided with a locking dog 24 pivoted in a position thereon and so formed to adapt it to engage V shaped teeth which are formed vertically above the dog in the lower side of a graduated scale plate fixedly secured to a standard frame C, the dog having means to be moved and being movable into and away from engagement with said teeth longitudinally of the shifter handle, substantially as described.

JAMES T. STODDARD.

Witnesses:
TRUMAN J. GEOORT,
FRANK A. BULLINGTON.